US010609785B1

(12) United States Patent
Fardadi et al.

(10) Patent No.: US 10,609,785 B1
(45) Date of Patent: Mar. 31, 2020

(54) MULTI-PURPOSE MULTI-AGENT INFRARED SENSOR SYSTEM FOR COMMERCIAL AND RESIDENTIAL LUMINAIRES

(71) Applicant: DMF Inc., Carson, CA (US)

(72) Inventors: Mahshid Fardadi, Irvine, CA (US); Andrew Kindler, San Marino, CA (US)

(73) Assignee: DMF Inc., Carson, CA (US)

( * ) Notice: Subject to any disclaimer, the term of this patent is extended or adjusted under 35 U.S.C. 154(b) by 0 days.

(21) Appl. No.: 15/897,955

(22) Filed: Feb. 15, 2018

Related U.S. Application Data

(60) Provisional application No. 62/459,427, filed on Feb. 15, 2017.

(51) Int. Cl.
*H05B 37/02* (2006.01)

(52) U.S. Cl.
CPC ..... *H05B 37/0227* (2013.01); *H05B 37/0218* (2013.01); *H05B 37/0272* (2013.01)

(58) Field of Classification Search
CPC ............ H05B 37/0227; H05B 37/0218; H05B 37/0272
USPC ........................................................ 315/154
See application file for complete search history.

(56) References Cited

U.S. PATENT DOCUMENTS 6,583,573 B2 6/2003 Bierman
7,190,126 B1 3/2007 Paton
7,592,583 B2 9/2009 Page et al.
9,078,299 B2 7/2015 Ashdown
2007/0185675 A1 8/2007 Papamichael et al.
2007/0273509 A1* 11/2007 Gananathan ....... H05B 37/0218 340/540
2010/0244709 A1 9/2010 Steiner et al.
2012/0074852 A1 3/2012 Delnoij
2013/0009552 A1 1/2013 Page
2015/0281905 A1* 10/2015 Breuer ................ H04B 10/116 398/118
2015/0289346 A1* 10/2015 Igarashi ............ H05B 37/0227 315/149
2016/0095189 A1* 3/2016 Vangeel ................. G06F 8/654 315/152
2016/0174333 A1* 6/2016 Kim ................... H04L 12/6418 315/152
2016/0286629 A1* 9/2016 Chen ................. H05B 37/0272

(Continued)

*Primary Examiner* — Don P Le
(74) *Attorney, Agent, or Firm* — Foley & Lardner LLP

(57) ABSTRACT

The present embodiments relate to an advanced error free occupancy detection system based on thermal infrared (IR) imaging and located in ceiling luminaires. The occupancy detection system includes a plurality of luminaires configured to wirelessly communicate with each other. Each luminaire of the plurality of luminaires includes a wireless interface, and a thermal IR imaging sensor and a microcontroller. The wireless interface is configured to communicate with the rest of the plurality of luminaires. The thermal IR imaging sensor is configured to collect thermal IR images of a vicinity of the luminaire. The microcontroller is configured to process the thermal IR images for detecting one or more humans in the vicinity of the luminaire and to generate dimming signals for one or more of the plurality of luminaires based on the detection.

22 Claims, 3 Drawing Sheets

200

210 Luminaire
220 Wireless interface
230 Sensor 230
240 Microcontroller
250 Photodetector 210 Luminaire
220 Wireless interface
230 Sensor 230
240 Microcontroller
250 Photodetector 290 Network 210 Luminaire
220 Wireless interface
230 Sensor 230
240 Microcontroller
250 Photodetector 210 Luminaire
220 Wireless interface
230 Sensor 230
240 Microcontroller
250 Photodetector

(56) References Cited

U.S. PATENT DOCUMENTS

| | | | | |
|---|---|---|---|---|
| 2017/0104532 | A1* | 4/2017 | Stout .................. | H04B 10/1149 |
| 2018/0227998 | A1* | 8/2018 | Polychronakis ... | H05B 33/0854 |

* cited by examiner

MULTI-PURPOSE MULTI-AGENT INFRARED SENSOR SYSTEM FOR COMMERCIAL AND RESIDENTIAL LUMINAIRES

CROSS-REFERENCE TO RELATED APPLICATIONS

This application claims the benefit of and priority to U.S. Provisional Patent Application 62/459,427, filed Feb. 15, 2017, which is incorporated herein by reference in its entirety.

TECHNICAL FIELD

The present embodiments relate generally to lighting systems and more particularly to a multi-purpose multi-agent infrared occupancy detection sensor system for commercial and/or residential luminaires.

BACKGROUND

In 2015, the United States Energy Information Administration (EIA) estimated that about 404 billion kilowatt hours (kWh) of electricity were used for lighting. Out of the 404 billion kWh, 259 billion kWh were used for commercial sector, which includes commercial and industrial buildings, public street and highway light; and 145 billion kWh were used for residential lighting. In view of the energy consumption required in providing lighting to the United States and elsewhere, the incentive exists to reduce energy consumption as much as possible. Light harvesting devices, occupancy sensors, dimmers and solid-state lighting devices are examples of energy saving technologies. Despite the existing technologies, further reductions in energy consumption are desirable.

SUMMARY

At least some embodiments of the present disclosure relate to an advanced occupancy detection system based on imaging sensors (e.g., thermal infrared (IR) sensors) that are disposed in ceiling luminaires. This occupancy detection system is designed to operate in tandem with a sophisticated dimming system (which is also disposed in the luminaire) that can reduce light intensity in portions of the room where there is no occupant.

At least some embodiments of the present disclosure utilize technologies such as the Internet of Things to revolutionize the lighting industry. The ubiquitous presence of recessed luminaires combined with the overhead location makes the recessed luminaires ideal nodes for connectivity as well as event detection by way of suitable sensors. In some embodiments, the recessed luminaires contain a connected set of thermal IR imaging sensors coupled to microcontrollers that can conduct image processing. The sensor/microcontroller platform can be utilized to deliver an advanced form of occupancy sensing that is not necessarily dependent on motion detection. In some other embodiments, applications for the sensor/microcontroller platform include, e.g., temperature mapping for sophisticated HVAC (heating, ventilation, and air conditioning) controls, and fall detection for monitoring the elderly.

In some embodiments, the disclosed occupancy detection technology can allow for complex dimming strategies that are not feasible with existing technologies. These strategies can achieve previously unattainable energy savings by tracking the occupant and controlling the brightness of luminaires according to position of the occupant. Although the energy savings are dependent on the number of occupants and the length of time that the occupants remain within a room, a savings of at least 50% can be achieved as an example for a single occupant in a large room. This approach to dimming can be applied in conjunction with light harvesting during the day. In order for the luminaires to be controlled in this way, the luminaires cooperate with each other by communicating over a network such as a Wi-Fi or Bluetooth network. Furthermore, in order to deliver optimal energy savings while avoiding unpleasant visual light effects, an optimization with respect to dimming intensity and energy savings can be performed using the luminaires computational capabilities as agents in a multi-agent system.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
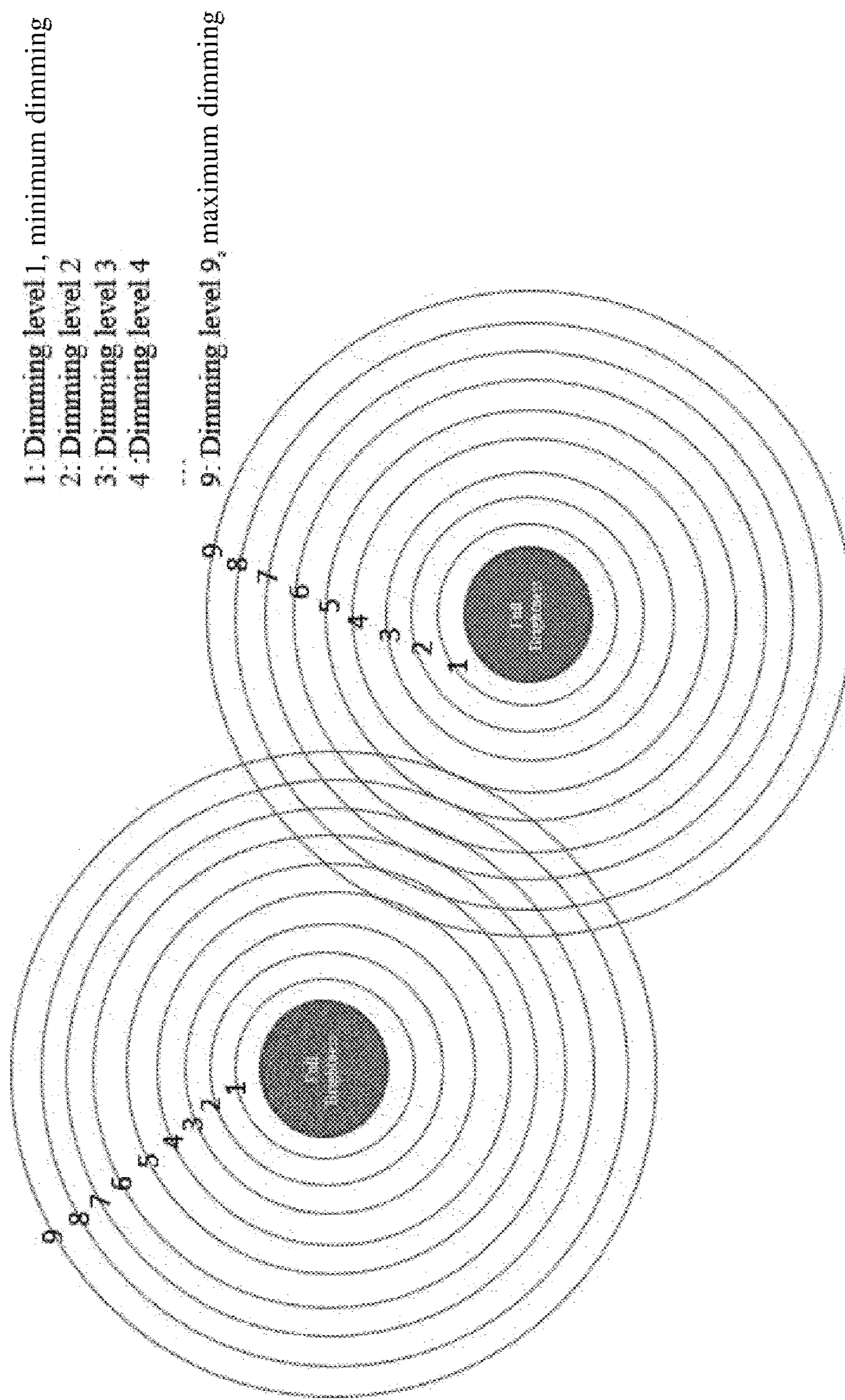
FIG. 1 is a schematic diagram of overlapping between zones of two different dominant luminaires when there are two occupants in a room.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Occupancy or Vacancy Detection

Currently standalone occupancy or vacancy detection control devices are commercially available. Existing devices detect motion using either passive infrared (PIR) and/or ultrasonic technology. The PIR technology detects a change in temperature as somebody enters a room and ultrasonic detection involves frequency shifts associated with the impingement on a moving object. Without a sensed motion, these devices trigger the circuit to shut-off the lighting. However, neither technology is accurate and in some cases this results in a false-off. Furthermore, these devices can be difficult to place in a room for successful coverage for detection range, and false on/off triggers can be annoying to the occupants and sometimes can cause a user to override or disable the controls.

Moreover, it is difficult to appropriately place lighting control sensors in spaces, verify compatible sensor to fixture communication, and balance user experience. This complication of sensor integration has led to reliance on sensor-specialists; ultimately adding further complication and cost increases. Such ambiguity and inaccuracies in current sensor detection leave developers hesitant in deploying such devices in public area spaces. There is also a significant amount of direct and indirect installation cost in deploying existing devices. The most notable differentiator of costs between devices is the sensors range; when mounted to an 8' ceiling, sensors typically have detection fans of 18' to 64' with respective costs ranging from $45-$125. Most of these sensors also communicate to luminaires via a 0-10Vdc dimming protocol. Therefore, compatible luminaires are specified to include 0-10Vdc protocol communication. An adder for a 0-10Vdc compatible device is approximately $25 per luminaire. For example, the national average for installation cost of a "vacancy-sensor" is $30; this cost includes the additional two-wires (0-10Vdc control wires) that originate from the sensor and are daisy chained to each fixture, the mounting hardware for the fixture, and labor costs. Fixtures mounted 8'-10' are typically spaced 8' on center to achieve uniform illumination, therefore the approximate additional cost per luminaire is $55.00 when factoring in vacancy-detection. (For a sensor with an 18' range and a luminaire with an 8' on center placement capability, the sensor cost per fixture is $45/(18/8)=$20, plus the $25 0-10Vdc adder, plus the installation cost per fixture of $30/(18/8). The total is approximately $58). Furthermore, in most cases current lighting control systems require a lighting control manufacturer's representative to calibrate the installed control system(s). These factory start-up costs further increase the implantation costs of lighting controls and reduces flexibility for occupants.

The disclosed technology leverages electronics in current lighting fixtures to: significantly reduce the implementation cost of vacancy-sensors, eliminate the requirement for additional layouts of lighting control systems, eliminate the need for lighting control commissioning, and create a vacancy sensor system that eliminates false-on or false-off triggers. In addition, the disclosed technology can be used in other applications such as elderly fall detection, water leak detection, and fire detection and alarm.

For example, for the elderly fall detection application, the disclosed technology can use thermal IR camera to determine a fall by a combination of at least three factors. First, the camera and image processor can detect a fall by noting the change in size and shape of a human that is standing compared to the size and shape of the human that has fallen. Second, the speed of the fall can be determined by analyzing the fall time as determined by shape change. This fall time allows the system to distinguish between somebody getting on knees, or actually falling. Third, the distance from the camera can be estimated by examining the resolution of the IR image. The resolution of the image can degrade with the subject distance. For example, when using a low resolution sensor like a 32×32 pixels device, the effect of degraded resolution is significant. This is because the pixels are relatively large. A larger segment of the subject is sensed by the pixel as the subject recedes from the camera. The averaging effect of the large pixel can eliminate fine details and reduce the ability to detect temperature variations over small areas. Given enough distance, temperature variations may become indistinct and inaccurate.

Currently occupancy sensors, dimmers, and light-harvesting devices are utilized by building owners and developers either to satisfy local building codes (e.g., California's Title 24, ASHRAE 90.1 or IECC standards) or to decrease building operating costs in common area spaces. Typically, these codes are applicable to commercial buildings that are larger than 5000 square feet. Moreover, incentives exist to persuade building owners to decrease energy loads by integrating energy saving devices in their current spaces. Individual control strategies may save between one-quarter and one-third of lighting energy, while combining multiple controls strategies the saving can be nearly 40 percent. The disclosed technology can be applied to areas that require sensors due to code mandates or in general public areas; these spaces include, e.g., corridors, private offices, meeting rooms, general meeting areas, parking lots, public bathrooms, lobbies, patios and gyms. Developers are resistant in making additional initial capital investments if such an investment does not either improve cash-flow or the NPV (Net Present Value) of the property. Implementing controls in the living units can decrease energy load on the building and overall energy costs, but the cost of implementation often does not financially impact cost of ownership in a positive way by using existing technologies. The disclosed technology can also be applied to multifamily developers and single family residences.

In some embodiments, the disclosed technology can be applied to developed niche markets, office buildings and multifamily construction (Multi-family Housing: Residential buildings containing units built one on top of another and those built side-by-side which do not have a ground-to-roof wall and/or have common facilities (e.g., attic, basement, heating plant, plumbing, etc.)). In some embodiments, the disclosed technology can be applied to other markets such as educational facilities and retail spaces. The disclosed technology can be utilized by, e.g., office and multi-family developers and influencers. Influencers of office and multi-family development include, e.g., electrical engineers, architects, interior designers, general contractors and electrical contractors.

Luminaires delivering a minimum light output of between 1,000 lm (15 W) to 1,500 lm (23 W) are typically utilized in corridors, private offices, and lobby areas with luminaire mounting heights of eight to twelve feet. In the common areas the luminaires typically operate twenty-four hours a day, 365 days a year, resulting in an annual energy usage of between 582 GWh and 892 GWh (The energy E in kilowatt-hours (kWh) is equal to the power P in kilowatts (kW), times the time period tin hours (hr): E (kWh)=P (kW)×t (hr). For example: 0.582 GWh=(0.015 kW*4,426,250 luminaires)*(365 days*24 hours)/1,000,000). With the average retail energy rates for commercial users of $0.11 per kWh and for residential users of $0.129 per kWh, these luminaires cost in the range $75 to $115 million to operate annually. A reduction of thirty percent of energy-cost for each luminaire amounts to an annual savings of at least of $19.2 million. On an individual luminaire basis this calculation equates to a saving of $5.09 to $7.8, from the annual operating cost range of $16.95 to $25.99. Further savings are made when the luminaires in office spaces are taken into account, though the savings may be slightly less due to the lower cost per kWh and luminaire utilization.

Utilizing existing technologies in commercial building spaces, e.g., existing "vacancy sensors", a developer can expect an approximate payback in the range of 5.6 ($44/$7.8) to 11.4 ($58/$5.1) years. This is typically outside the developer's payback requirements of three to five years.

In some embodiments, the cost of installation and the cost of ownership can be reduced significantly with the integration of the disclosed vacancy sensor technology and utilizing enhanced efficiency LEDs and power supplies. The cost of installation can be reduced to $14 from $44-$58. The disclosed sensor technology can save a further twenty percent of energy due to its ability to discriminate accurately between occupancy and vacancy and with the multipoint room coverage. This equates to a payback in the range of 1.1 ($14/$13.0) to 3.3 ($28/$8.48) years. This payback range can allow the typical developer to realize a return on investment.

The present embodiment's value proposition is to reduce the current payback of utilizing a room mount vacancy sensor to 1.1 years versus 5.6 years by incorporating improved sensors in every recessed luminaire. This is achieved by eliminating additional installation cost (no separate sensor device or control wiring), and improving sensor room coverage, simplifying electrical specification of vacancy sensors, eliminate the need for commissioning and increase efficiency savings.

Advanced Occupancy Detection and Energy Savings in Lighting Systems

In recent years, a reduction in energy consumption by advancements in lighting technology have been utilized by taking advantage of a number of strategies including light harvesting and "occupancy sensing." Light harvesting reduces energy consumption by dimming the artificial light when some natural light is available. Occupancy sensors turn off room lights or selected banks of lights when no one is present in the room. They can be used in conjunction with light harvesting during the daytime or without, as in the evening, when light harvesting is unnecessary.

In some embodiments, a further reduction in energy consumption can be achieved by implementing a sophisticated dimming strategy that can be used in conjunction with light harvesting during the day or by itself in the evenings. Using this strategy only the lights closest to an occupant operate at full power. The rest of the lights dim proportionally with distance, although not necessarily in a linear fashion. The gradient in light intensity is chosen such that a balance between energy savings and occupant comfort is determined. An abrupt transition between full brightness and maximum dimming can be disconcerting to an occupant. In order to make this dimming strategy work, the disclosed occupancy sensing technology replaces the conventional motion detector style occupancy sensor. The luminaires of the disclosed occupancy sensing technology perform calculations and exchange brightness information with other luminaires in the same room.

Occupancy sensors detect the presence of people in a space and turn the lights on or off automatically. Most existing occupancy sensors are actually motion detectors. They are generally based on infrared, ultrasonic, or microwave sensors. These motion detectors are not able to determine the location of an occupant, or the number of occupants. Additionally, the existing motion detectors are subject to error. Motion detectors suffer from false triggering, long delay to shut down, and inability to detect fine motion with the consequence of undesirable shutdowns. The long delays to shutdown are actually designed into the product to prevent unintentional shut down during periods where an occupant is not moving. Existing occupancy sensors also require commissioning by skilled labor. Costly commissioning can defeat the energy savings. In contrast, the disclosed technology can eliminate the requirement of professional commissioning with a plug and play design.

Existing motion detector style occupancy sensors are used to turn lights on and off in a room. Motion is detected as an occupant enters, causing the lights to turn on. When an occupant leaves the room, lack of motion leads to shutdown of the lights. Sometimes the lights shut down if the occupant is too still. Typically, all the lights or certain banks of lights are turned on when a particular motion detector is activated. Although automatic shutdown of lights saves energy, more energy can be saved because sparsely occupied rooms can be still fully illuminated.

In some embodiments, the disclosed technology utilizes infrared imaging sensors, which do not require movement for detection. The infrared imaging sensor is coupled to a microcontroller that can perform image processing. In conjunction with data from other luminaires in the connected system, the system can identify how many, and where the occupants are. By tracking the occupants, the system can constantly increase and decrease dimming such that the brightest areas always surround the occupant. The processing power within the luminaire provided by the included microcontroller allows performing optimizations as an element within a multi-agent system. For example, the system may optimize between the least energy and the maximum visual comfort. The least energy is needed for providing a cylinder of light immediately around the occupant. However, the cylinder of lighting is visually disturbing as well as somewhat dangerous because other portions of a room can be dark. A tapering off of brightness as the distance from the occupant increases would be more appealing and safer for users. The tapering can be more advanced as the number of occupants increases and the distances between the occupants change. In the case of multiple occupants, dimming may be limited based on the proximity of the occupants. If the occupants are far apart, the dimming strategy can allow some of the lamps to operate at the lowest output. If the occupants are closer together, the lights are that dimmed can be brighter. Additionally, the luminaires can be at full brightness while an occupant walks in a room, and begin to dim after the occupant is seated. The strategy prevents a potentially visually disturbing "strobing" effect while an occupant walks in and the lights brighten and dim in response.

In some embodiments, the savings in energy can be at least 50% based on a single occupant in a large room compared to 25%-30% of savings with existing PIR sensors.

In some embodiments, the disclosed technology utilizes a microcontroller based image processing software to identify occupants. In some embodiments, the disclosed technology includes a communication system such as a Wi-Fi or Bluetooth network to share sensor data. In some embodiments, the software of the microcontroller controls the dimming levels. In some embodiments, the electronics including the sensors and the microcontrollers fit within recessed lighting fixtures. In some embodiments, the IR optics of the sensors can be integrated with conventional visible light lenses that are already in the luminaires.

Occupancy Sensor for the Occupancy Detection System

About 19% of energy used in the commercial sector is consumed by lighting, which is about 259 billion kwh. Significant savings in this sector are possible and hardware has been made available attempting to achieve the savings. Generally, there are three approaches to conserving energy. First, lighting controls that shut down lighting at certain times of day. Second, existing occupancy sensors that are actually motion detectors have been developed to shut lighting down when motion ceases in a room. Third, daylight Harvesting systems that dim artificial lighting when natural light becomes available.

Existing so-called occupancy sensors have become increasingly common as a consequence of the desire to reduce energy costs as well as in response to new regulations. The most common sensors are based on passive infrared motion detection and are known as PIR sensors. It is common to achieve 25%-50% savings. They are often used on motion detector lights sold at hardware stores. These are generally available at modest cost but can be accidentally triggered by, e.g., blasts of warm air from heating system registers. They also fail to detect occupancy when there is no movement. Less common are ultrasonic sensors (both active and passive) which are more expensive. These are unaffected by thermal artifacts. They are often combined with PIR sensors to reduce accidental triggering. Yet more expensive and even less common are the microwave sensors. This sensor can detect through walls, which can provide better coverage, but at a cost of more accidental triggering from motion in adjacent rooms. All three of these sensors have issues either with false triggering or missed triggers. These factors substantially decrease the energy savings that may be potentially achieved. The root cause is related to the "delay to off" function that all of these devices require. In order to prevent the lights going out when an occupant is not moving, each triggering of the sensor sets off a delay function that prevents the lights from going off for a predetermined time. If the occupant actually leaves the room, the lights still stay on. Depending on how this delay is set, it is possible to negate any energy savings. On the other hand, energy savings in hallways where people are in constant motion only require short delay to off times. In such cases, up to 80% savings have been achieved. Clearly a sensor that is less prone to error is desirable.

Cameras sensitive to visible light or infrared light are available. Using these cameras and employing image processing it is possible to determine the presence of occupants. These sensors are resistant to both false negatives and positives, but may be potentially sensitive to stray light depending on the sophistication of the software. In some embodiments, the disclosed technology utilizes more advanced sensors based on thermal IR imaging. The thermal IR imaging is similar to visible light imaging but with at least two differences. First, the sensor detects long wave infrared light at approximately 13 microns corresponding to the temperature of the object being viewed. Second, increased accuracy is possible because the thermal image is a temperature map. Temperature mapping can distinguish between warm humans and cold objects of the same size or similar sizes. Image processing applied to a thermal image combined with temperature mapping increases the reliability of detection. Also, the thermal IR sensor is unaffected by stray light because the camera lens is not transparent to visible light. Given the accuracy of this sensor, the delay to off function can be unnecessary.

The relative advantages and disadvantages of existing technology are summarized below.

TABLE 1 comparion of occupancy sensor technology

| | PIR | Ultrasonic (active) | Combined PIR/ULT | Micro-wave | Visible Light Video | Thermal image Video |
|---|---|---|---|---|---|---|
| False Positives | Yes, Many | Yes | Low | Yes | Low | No |
| False Negatives | Some | Some | Yes | Low | Low | None |
| Area Coverage | Good | Better | Good | Best | Good | Good |
| Stray Light Sensitivity | No | No | No | No | Yes | None |

For purposes of occupancy sensing, a high definition image is not required, but too low a resolution makes it difficult to identify human shapes and determine temperature accurately. In some embodiments, the disclosed technology can use a 32×32 pixels sensor. Such a sensor has a low cost, while at the same time delivering sufficient resolution to resolve the human shape and to resolve temperature adequately. Accuracy in temperature measurement is determined by how much of the image a single pixel sees. Each pixel averages the temperature over the area it covers. If there are few pixels, the effect of averaging may reduce the accuracy of temperature measurement to the point that it is less useful. A 32×32 pixels sensor may have sufficient resolution to detect the presence and measure the temperature of a human body accurately when installed in a luminaire on a ceiling as much as 5 meters high.

Image Processing for the Occupancy Detection System

Once the signal has been received (e.g., using a I2C protocol), the data undergoes image processing. During the image processing step, which relies on an on-board microcontroller, the data is converted into an image that can be analyzed as to size, shape, and temperature distribution across the surface.

The basic image processing strategy is that all objects the sensor detects are initially stored as an image. Objects that are determined not to be of interest are removed from the image and used to form a clutter map. This clutter map is used to strip the raw image from inanimate objects. It is regularly updated and is used to reduce the number of objects that the sensor and software must analyze. The image is decluttered using the same analysis used to recognize occupants i.e. one based on size, shape, and temperature.

The combination of all three factors in contrast to the two factors of size and shape from conventional visible light video can be used to determine occupancy more accurately. An example of the improved accuracy may be the case of a person sitting on a chair. If the chair conforms to the body, conventional image processing software may not be able to distinguish between the chair and the person. The addition of temperature mapping, possible with an IR sensor, may make it easy to resolve the person and the chair by virtue of the temperature difference between the two. The image processing software may also locate the occupants in its field of view as well as counting them. This information will be shared with other luminaires in order to decide whether a room is sufficiently filled with people that all luminaires will be set to full power.

Dimming Strategy for the Occupancy Detection System

In some embodiments, the disclosed technology can apply a dimming strategy for larger rooms typically found in commercial buildings. The dimming strategy provides large energy savings. Software can be designed to ensure that luminaires will be kept at full brightness only in the immediate vicinity of the occupants. As the distance increases from the occupant, the luminaires will increasingly dim. The degree to which the luminaires dim can be based on an optimization of comfort and savings in energy as well as ambient light.

Another characteristic can be regarded as an implementation of light harvesting. In this context, comfort refers to avoiding extreme changes of light intensity if light intensity in a room changes from full power to zero at a sharp boundary. If the lighted space is occupied by more than one person, then the dimming can be readjusted to take them into account. This means less dimming at the center point between the occupants if they are closer together. As the location of the occupants shifts the pattern of lighting can shift to ensure that energy consumption is minimized and comfort is maximized. This feature is referred to as dynamic zoning in contrast to fixed zoning encountered in conventional technologies. Fixed zoning ties banks of lights in a large space to different occupancy sensors. This regime allows for partial shutdown of lighting, when one of the sensors does not detect motion. However, in such a system, there is no dimming.

This dynamic zoning strategy can be implemented both for night time applications as well as daylight applications. It is compatible with daylight harvesting which the disclosed technology can incorporate as an additional feature.

Commissioning for the Occupancy Detection System

The disclosed occupancy detection system is "plug and play". Unlike conventional occupancy sensors, no professional commissioning is required by installers. One reason is that delay-to-off controls are not needed because the disclosed system has a low error rate. An initial calibration process is automatic. This process can be initiated by, e.g., a push of a button. During this calibration step, the photodetector is activated in each light without the light going on. The ambient light is measured and recorded. Thereafter, each light in the room is turned on, one at a time. Each time a light is turned on, all the photodetectors in all the other lights record the light intensity. The ambient light intensity is subtracted from the intensity measured (at each light) when the lights are on. This net intensity data is stored in the light and also transmitted back to the dominant light where the data is stored.

This process is repeated for each light. The process of taking into account ambient light may be a form of light harvesting, with no additional effort expended. At the end of the commissioning process, each light can store intensity data for all the lights in the room when that particular light is dominant. This intensity data can be converted to a relative distance information. After commissioning, when a particular luminaire is triggered, the luminaire can immediately send dimming instructions to other luminaires.

In some embodiments, the disclosed system can function during the day, as well as at night. In particular, there is a scenario that the ambient light is no longer generated merely by other luminaires, but also depends on light entering through a window. In this scenario, the disclosed technology can achieve a sophisticated light harvesting because the system can dim luminaires that are not near an occupant and also dim luminaires in response to outside light. In contrast, in conventional light harvesting techniques, energy savings is achieved only by dimming all luminaires in response to outside light.

Dimming Control for the Occupancy Detection System

The dimming strategy takes advantage of the computational resources embedded in the luminaire for use in image processing. For this purpose, the luminaires communicate with each other. In some embodiments, a Wi-Fi communication is used. Each luminaire has the Wi-Fi capability. Each luminaire will carry a unique identifier. Such identifiers are common to Wi-Fi devices. A photodetector system is also embedded that can detect how much ambient light (from other lights or daylight) floods the space under a lit luminaire. Ambient light can be measured by momentarily shutting of a luminaire and allowing a photodetector to make a measurement. Given these resources, the following control scheme can be achieved.

When a single occupant walks into a room, the occupancy detector from any triggered light will turn all the lights in the room on. The lights stay on until the occupant sits. At that time, the light overhead becomes the dominant light, and instructs all the other lights in the room to dim to an intensity non-linearly (or linearly) proportional to the distance from the triggered light. This can be done by addressing each luminaire by its unique identifier. The relative distance between the dominant luminaire and other factors can be determined during commissioning of the lights. The relative distance can be determined by the relative brightness at a luminaire divided by the characteristic length of the room. The relationship between luminaire brightness and the relative distance from the dominant light can be represented by a standard dimming curve programmed in advance by the manufacturer.

Because the curve employs the relative distance, it can be used in rooms of any size, however, this curve may be modified in situ to optimize both energy savings and comfort. Comfort is a function of the rate of change of light intensity with distance. The same dimming curve applied to a small room may result in sharp transitions in intensity. A correction factor can be applied to the standard dimming curve in smaller rooms to preserve comfort. This correction factor is derived from the room dimensions which can be assumed to be known. The correction factor can reduce the maximum dim allowed and so increase energy consumption. An optimization of the dimming curve and the comfort correction factor can be used to minimize energy consumption and maximize comfort. The resultant curve is referred to as the comfort curve. The comfort curve does not directly specify the intensity of the light. In order to set the correct intensity of each light, the system takes into account the comfort curve, the spillover light from other luminaires, and the ambient light. The actual intensity of the luminaire is what the comfort curve would specify less the ambient and spillover light. In order to minimize the energy of the ensemble of lights in a room, an optimization is performed with respect to light output and spillover light in the presence of ambient light. In some embodiments, the ambient light is the spillover light at night; during the day, the ambient light includes spillover light and outside light. The interaction between the luminaires and optimization can be summarized as follows for the case of a single occupant.

Let $x=(x_1, x_2, \ldots, x_n)$ where x can be any value between 0 and 1. x=1 denotes 100% full power applied to the luminaire:

$$\text{minimize}\sum_{i=1}^{m} x_i^2.$$

This summation is minimized subject to the following constraint in each light:

$$\text{Target}_i - 2\% \text{ error} \le l_i x_i + \sum_{j=1}^{N} l_{ij} x_j + l_{ambL} \le \text{Target}_i + 2\% \text{ error}$$
$$0 \le x_i \le 1$$

The $\text{Target}_i$ value can track the comfort curve as much as possible, $x_i$ is the dimming level for light i, $l_{ij}$ is the effect of light j on i from calibration data, and $x_j$ is the dimming level for light j, $l_{ambi}$ is the ambient light level at the ith location, and $l_i$ is the total lumen output of light if it is at 100% power. It is possible to solve the problem as an iterative problem and change the percentage of error to the higher value if the optimization problem does not converge. Note that this is a convex problem and efficient to solve and it is solved in real time to take into account $l_{ambi}$. The objective is for the target value to track the comfort curve as much as possible.

Each of the luminaires in the room has data stored that can instruct other luminaires to dim. A different dimming pattern may be associated with each luminaire to take into account position. The pattern includes a set of zones of different brightness levels. A zone can include any number of luminaires. Therefore, depending on the luminaire triggered, a different set of zones can be created.

If two occupants enter the room, there is additional complexity. For example, the case of two occupants creates overlapping sets of zones. It can be assumed as a sparse problem, with only limited overlap of the brightest zones. FIG. 1 shows a schematic of overlapping between two zones when there are two occupants near one another but not actually close (sparse configuration). When one light receives different signals from two different dominant luminaires, which means that the light belongs to two different zones. The desired dimming curve is available from visual comfort model. The approach for this case is to solve another optimization problem locally among the lights that belong to two or more different zones. The aim is to reduce the excess luminosity that results from the overlap. Here there are a few agents (luminaires) in the vicinity of the overlap that can communicate with one another. The luminosity profile from each side is already available. Using this data, the agents can use consensus algorithms. A variety of consensus algorithms are available, with reasonable computational burden. With the sparse case, the overlap is necessarily among the least luminous zones. Among those zones, only the brightest zones are worth adjusting.

FIG. 1 is a schematic diagram of overlapping between zones of two different dominant luminaires when there are occupants in the room. As shown, if the occupants are closer together, exceeding a threshold value, a cluster of lights at full power will illuminate and surround the occupants. This cluster radius R must be calculated by the following optimization:

$$\text{Minimize}_R (L_i - R)^2,$$

in which $L_i$ is the distance of lights from the dominant luminaire (also referred to as center of gravity).

The same comfort curve can be applied to dim the luminaires from the cluster using the edge of the cluster as the starting point for applying the curve. The edge is defined as the perimeter of the cluster around a centrally located luminaire. This luminaire is at the “center of gravity” of the cluster, it can be the dominant luminaire. This luminaire location, the “center of gravity” of the cluster can be calculated by the luminaires in the cluster communicating with each other.

The above strategy can be applied for any number of occupants until a threshold value is reached. At that point the space to be lit is considered “full”. When the system determines that the space is “full”, dimming is overridden and all lights are set to full power.

Hardware Design for the Occupancy Detection System

In some embodiments, the hardware of the occupancy detection system includes an infrared sensor connected to an electronics board that both digitizes the IR sensor output and provides computational resources for both image processing and intelligent dimming functions. Another board may be included to allow Wi-Fi communications (or other wireless network communication) between luminaires. A power supply is used to provide electrical power. These electronics can be fit into a luminaire.

Figure 2:
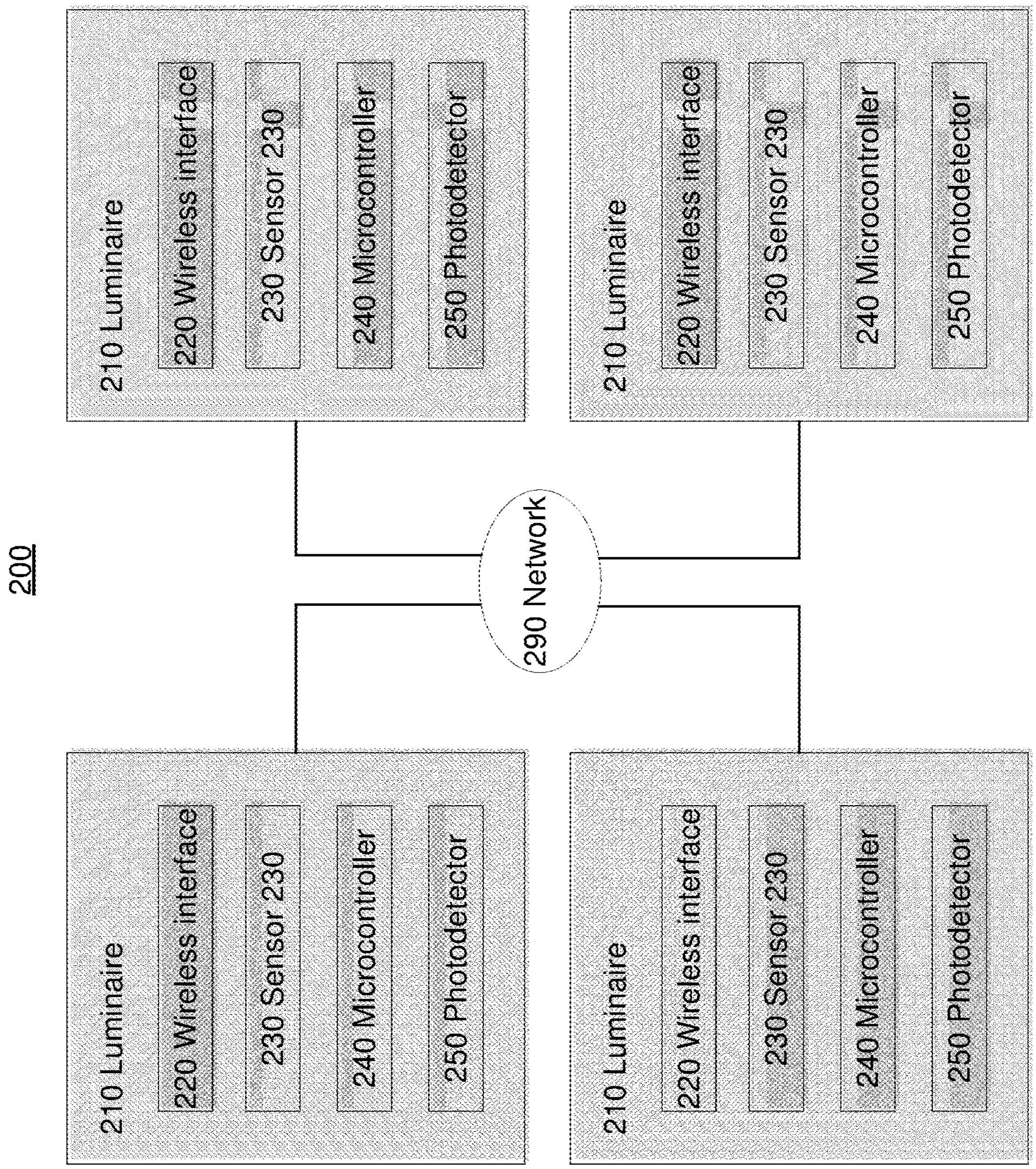
FIG. 2 illustrates an occupancy detection system includes a plurality of luminaires that include thermal IR imaging sensors and microcontrollers.

FIG. 2 illustrates an occupancy detection system 200 includes a plurality of luminaires 210 (also referred to as agents). The luminaires 210 are configured to wirelessly communicate with each other. Each luminaire 210 of the plurality of luminaires 210 includes a wireless interface 220, and a thermal IR imaging sensor 230 and a microcontroller 240. In some embodiments, each luminaire 210 of the plurality of luminaires 210 may further include a photodetector 250 that is configured to measure an ambient light level in the vicinity of the corresponding luminaire 210. An example daylight harvesting luminaire that can be adapted for use in some of the present embodiments is described in U.S. Patent Publ. No. 2017/0290129, the contents of which are incorporated herein by reference in its entirety.

The wireless interface 220 is configured to communicate with the rest of the plurality of luminaires 210 via a network 290 (e.g., a Wi-Fi or Bluetooth network). The wireless interface 220 can be, e.g., a Wi-Fi interface or a Bluetooth interface.

The thermal IR imaging sensor 230 is configured to collect thermal IR images of a vicinity of the corresponding luminaire 210. In some embodiments, the thermal IR imaging sensor 230 can be a thermal IR camera having a resolution of at least 32 by 32 pixels. Such thermal infrared imaging sensors 230, coupled to the microcontrollers 240, may provide an occupancy detection free of false positive triggering or false negative triggering.

The microcontroller 240 is configured to process the thermal IR images for detecting (e.g., locating and counting) one or more humans in the vicinity of the luminaire 210. The microcontroller 240 is further configured to generate dimming signals for one or more of the plurality of luminaires 210 based on, e.g., sizes, shapes and temperatures of objects on the thermal IR images. The microcontroller 240 is configured to process the thermal IR images for generating a temperature map that distinguishes between humans and environmental objects. The microcontrollers 240 can also store information of the dimming curves of at least some (e.g., nearby) luminaires 210 of the plurality of luminaires 210 so that the microcontrollers 240 can generate instruction signals for dimming luminaires 210 of the system 200.

The microcontrollers 240, coupled with the thermal IR imaging sensors 230, can be used to implement some advanced dimming schemes. For example, at least one microcontroller 240 of the microcontrollers 240 of the plurality of luminaires 210 can generate a signal to turn on all the luminaires 210 in response to a detection that an occupant enters a room. Furthermore, at least one microcontroller 240 of the microcontrollers 240 of the plurality of luminaires 210 can identify one of the luminaires 210 that is overhead to an occupant as a dominant luminaire and instruct other individual luminaires 210 of the plurality of luminaires 210 to dim to an intensity proportional to a distance from the dominant luminaire to the individual luminaire 210. In some embodiments, the distances between the luminaires 210 can be determined by relative brightness levels during an initial commission of the occupancy detection system 200.

In some embodiments, when there are at least two occupants in a room, at least one individual luminaire 210 of the plurality of luminaires 210 may receive dimming instructions from at least two dominant luminaires 210 corresponding to at least two occupants. The dominant luminaires 210 and the individual luminaire 210 may determine a dimming level for the individual luminaire 210 based on a consensus algorithm.

Software Design for the Occupancy Detection System

In some embodiments, the software of the occupancy detection system may include three modules. The first module extracts images from the sensor data. The second module recognizes the presence of occupant. The third module controls the dimming protocol. In some embodiments, the software can be broken down into various modules, such as an image generating software module, a Wi-Fi communications software module, a decision module that uses size, shape, and temperature as decision parameters, an occupant detection software module, a full power module to restore full power at high occupancy, a module that uses the location and number of occupants as the basis for decision, a test software module, an advanced dimming software module, a commissioning software module, and/or an optimization software module.

Figure 3:
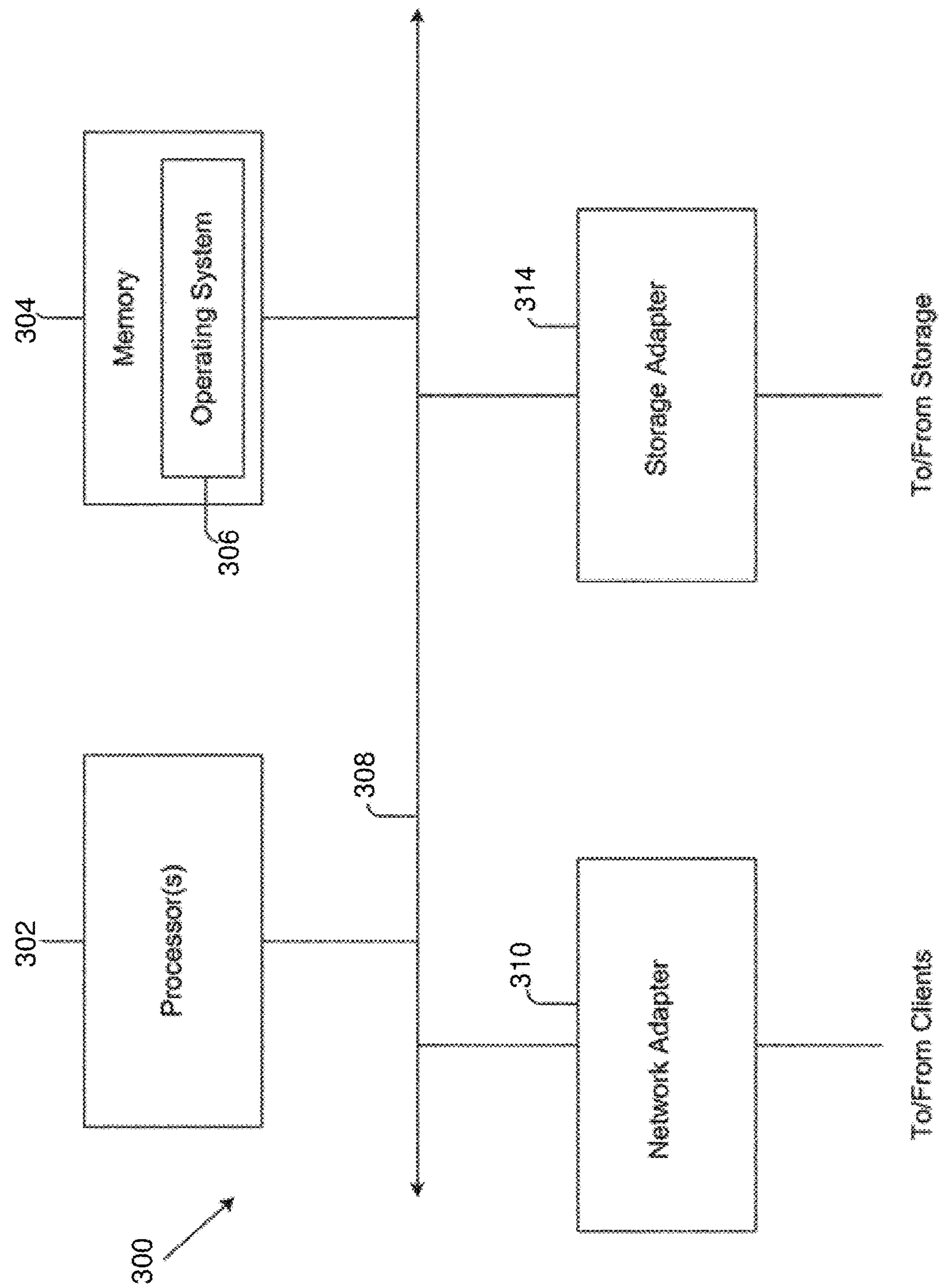
FIG. 3 is a high-level block diagram illustrating an example of a hardware architecture of a computing device that may perform various processes as disclosed.

FIG. 3 is a high-level block diagram illustrating an example of a hardware architecture of a computing device 300 that may perform various processes as disclosed, according to various embodiments of the present disclosure. The computing device 300 may be implemented as or be included as part of, e.g., the luminaire 210 or the microcontroller 240. In some embodiments, all or at least some of components of the computing device 300 can be implemented within the luminaire 210. For example, while a processor, a memory and a network adapter may be implemented within the luminaire 210; a data storage may be implemented within or outside of the luminaire 210.

The computing device 300 may execute some or all of the processor executable process steps described herein. In various embodiments, the computing device 300 includes a processor subsystem that includes one or more processors 302. Processor 302 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 300 can further include a memory 304, a network adapter 310 and a storage adapter 314, all interconnected by an interconnect 308. Interconnect 308 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The computing device 300 can be embodied as a single- or multi-processor storage system executing an operating system 306 that can implement various modules as disclosed. The computing device 300 can further include graphical processing unit(s) for graphical processing tasks or processing non-graphical tasks in parallel.

The memory 304 can comprise storage locations that are addressable by the processor(s) 302 and adapters 310 and 314 for storing processor executable code and data structures. The processor 302 and adapters 310 and 314 may, in turn, comprise processing elements and/or logic circuitry configured to execute the software code. The operating system 306, portions of which is typically resident in memory and executed by the processors(s) 302, functionally organizes the computing device 300 by (among other things) configuring the processor(s) 302 to invoke. It will be apparent to those skilled in the art that other processing and memory implementations, including various computer readable storage media, may be used for storing and executing program instructions pertaining to the disclosed technology.

The network adapter 310 can include multiple ports to couple the computing device 300 to one or more clients over point-to-point links, wide area networks, virtual private networks implemented over a public network (e.g., the Internet) or a shared local area network. The network adapter 310 thus can include the mechanical, electrical and signaling circuitry included to connect the computing device 300 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 314 can cooperate with the storage operating system 306 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 314 can include multiple ports having input/output (I/O) interface circuitry that couples to the disks over an I/O interconnect arrangement, e.g., a conventional high-performance, Fibre Channel (FC) link topology.

As used herein, the singular terms "a," "an," and "the" may include plural referents unless the context clearly dictates otherwise. Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. An occupancy detection system, comprising:

a plurality of luminaires configured to wirelessly communicate with each other;

wherein each luminaire of the plurality of luminaires includes:

a wireless interface configured to communicate with the rest of the plurality of luminaires via a network;

a thermal infrared (IR) imaging sensor configured to collect thermal IR images of a vicinity of the luminaire; and a microcontroller configured to process the thermal IR images for detecting one or more humans in the vicinity of the luminaire and to generate dimming signals for one or more of the plurality of luminaires and communicated from the each luminaire via the network based on the detection.

2. The occupancy detection system of claim 1, wherein each luminaire of the plurality of luminaires further includes a photodetector configured to measure an ambient light level in the vicinity of the luminaire.

3. The occupancy detection system of claim 1, wherein the thermal IR imaging sensor is a thermal IR camera having a resolution of at least 32 by 32 pixels.

4. The occupancy detection system of claim 1, wherein the microcontroller is configured to process the thermal IR images for generating a temperature map that distinguishes between humans and environmental objects.

5. The occupancy detection system of claim 1, wherein the microcontroller is configured to process the thermal IR images for detecting one or more humans in the vicinity of the luminaire based on sizes, shapes and temperatures of objects on the thermal IR images.

6. The occupancy detection system of claim 1, wherein the microcontroller is configured to process the thermal IR images for locating and counting one or more humans in the vicinity of the luminaire.

7. The occupancy detection system of claim 1, wherein the wireless interface is a Wi-Fi interface or a Bluetooth interface.

8. The occupancy detection system of claim 1, wherein at least one of the microcontrollers of the plurality of luminaires is configured to generate a signal to turn on all the luminaires in response to a detection that an occupant enters a room.

9. The occupancy detection system of claim 1, wherein at least one of the microcontrollers of the plurality of luminaires is configured to identifies one of the luminaires that is overhead to an occupant as a dominant luminaire and to instruct other individual luminaires of the plurality of luminaires to dim to an intensity proportional to a distance from the dominant luminaire to the individual luminaire.

10. The occupancy detection system of claim 9, wherein the distances between the luminaires are determined by relative brightness levels during an initial commission of the occupancy detection system.

11. The occupancy detection system of claim 9, wherein at least one individual luminaire of the plurality of luminaires receives dimming instructions from at least two dominant luminaires corresponding to at least two occupants.

12. The occupancy detection system of claim 11, wherein the dominant luminaires and the individual luminaire determine a dimming level for the individual luminaire based on a consensus algorithm.

13. The occupancy detection system of claim 1, wherein the thermal infrared imaging sensors coupled to the microcontrollers provide an occupancy detection free of false positive triggering or false negative triggering.

14. The occupancy detection system of claim 1, wherein the microcontrollers are configured to store information of dimming curves of at least some luminaires of the plurality of luminaires.

15. An occupancy detection system, comprising:

a plurality of agents configured to wirelessly communicate with each other;

wherein each agent of the plurality of agents includes:

a wireless interface configured to communicate with the rest of the plurality of agents;

a thermal infrared (IR) imaging sensor configured to collect thermal IR images of a vicinity of the agent; and a microcontroller configured to process the thermal IR images for detecting and locating one or more humans in the vicinity of the agent, wherein the microcontroller is further configured to generate a fall detection alerting signal for elderly monitoring based on the thermal IR images.

16. The occupancy detection system of claim 15, wherein the microcontroller is further configured to generate a temperature map for HVAC (heating, ventilation, and air conditioning) controls based on the thermal IR images.

17. The occupancy detection system of claim 16, wherein the microcontroller is further configured to generate HVAC control signals based on the temperature map.

18. The occupancy detection system of claim 15, wherein the microcontroller is further configured to generate the fall detection alerting signal in response to a change in a size or a shape of a human object.

19. The occupancy detection system of claim 18, wherein the microcontroller is further configured to analyze a fall time based on the change in the size of the shape of the human object.

20. The occupancy detection system of claim 18, wherein the microcontroller is further configured to determine a distance between the human object and the imaging sensor by examining a resolution of the images.

21. The occupancy detection system of claim 15, wherein the plurality of agents are a plurality of luminaires, and the microcontroller is further configured to generate dimming signals for one or more of the plurality of luminaires based on the detection of the one or more human in the vicinity of the luminaire.

22. The occupancy detection system of claim 21, wherein the dimming signals instruct at least some individual luminaires of the plurality of luminaires to dim to intensities proportional to distances from the individual luminaires to a dominant luminaire close to a detected human.

* * * * *